(12) United States Patent
Iwashita et al.

(10) Patent No.: US 11,808,901 B2
(45) Date of Patent: Nov. 7, 2023

(54) NUCLEAR REACTION DETECTION DEVICE, METHOD AND PROGRAM WITH HIGH DETECTION POSITION RESOLUTION

(71) Applicants: Nippon Telegraph and Telephone Corporation, Tokyo (JP); National University Corporation Hokkaido University, Sapporo (JP); National University Corporation Tokai National Higher Education and Research System, Nagoya (JP)

(72) Inventors: Hidenori Iwashita, Musashino (JP); Gentaro Funatsu, Musashino (JP); Michihiro Furusaka, Sapporo (JP); Takashi Kamiyama, Sapporo (JP); Hirotaka Sato, Sapporo (JP); Yoshiaki Kiyanagi, Nagoya (JP)

(73) Assignees: Nippon Telegraph and Telephone Corporation, Tokyo (JP); National University Corporation Hokkaido University, Hokkaido (JP); National University Corporation Tokai National Higher Education and Research System, Aichi (JP)

( * ) Notice: Subject to any disclaimer, the term of this patent is extended or adjusted under 35 U.S.C. 154(b) by 31 days.

(21) Appl. No.: 17/623,752

(22) PCT Filed: Jul. 3, 2020

(86) PCT No.: PCT/JP2020/026279
§ 371 (c)(1),
(2) Date: Dec. 29, 2021

(87) PCT Pub. No.: WO2021/002470
PCT Pub. Date: Jan. 7, 2021

(65) Prior Publication Data
US 2022/0252743 A1  Aug. 11, 2022

(30) Foreign Application Priority Data

Jul. 4, 2019  (JP) .................................. 2019-125190

(51) Int. Cl.
*G01T 1/16* (2006.01)
*G01T 1/24* (2006.01)
(Continued)

(52) U.S. Cl.
CPC ............ *G01T 1/245* (2013.01); *G01T 1/246* (2013.01)

(58) Field of Classification Search
CPC ........... G01T 1/16; G01T 1/1606; G01T 1/24; G01T 1/241; G01T 1/243; G01T 1/245;
(Continued)

(56) References Cited

U.S. PATENT DOCUMENTS 6,867,444 B1 *   3/2005   Hughes ..................... G01T 3/08
                                                     257/E31.086
7,499,308 B2 *   3/2009   Chen ....................... G11C 29/50
                                                     365/205
(Continued)

FOREIGN PATENT DOCUMENTS

EP   1729149 A1 * 12/2006 ............... G01T 3/08
FR   3046253     6/2017

OTHER PUBLICATIONS

L. Dilillo, F. Wrobel, J. M. Galliere, and F. Saigne, "Neutron detection through an SRAM-based test bench," 2009 3rd International Workshop on Advances in sensors and Interfaces, Trani, Italy, 2009, pp. 64-69. (Year: 2009).*

(Continued)

*Primary Examiner* — Allen C. Ho
(74) *Attorney, Agent, or Firm* — Fish & Richardson P.C.

(57) ABSTRACT

A nuclear reaction detection device 100 includes a semiconductor memory 100 arranged in an environment in which
(Continued)

radiation is incident, a position information storage unit 210 that stores spatial position information of a semiconductor element in the semiconductor memory 100, a bit position specifying unit 220 that detects that an SEU (Single Event Upset) has occurred in the semiconductor element included in the semiconductor memory 100, and specifies the semiconductor element in which the SEU has occurred, and a position calculating unit 230 that calculates a spatial position in which the SEU has occurred, based on the specified semiconductor element and the spatial position information.

7 Claims, 5 Drawing Sheets

(51) Int. Cl.
*G01T 1/29* (2006.01)
*G01T 3/08* (2006.01)

(58) Field of Classification Search
CPC .......... G01T 1/246; G01T 1/247; G01T 1/29; G01T 1/2914; G01T 1/2921; G01T 1/2928; G01T 1/2978; G01T 3/08; G01T 1/249; G01T 1/2985; G01T 1/2992
USPC ............ 378/98.8; 250/370.09, 370.1, 370.14
See application file for complete search history.

(56) References Cited

U.S. PATENT DOCUMENTS

| | | | | |
|---|---|---|---|---|
| 8,389,947 | B2* | 3/2013 | Kennedy | G01T 3/04 250/339.04 |
| 9,435,755 | B2* | 9/2016 | Roy | G01T 3/08 |
| 10,802,164 | B2* | 10/2020 | Roy | H01L 27/14658 |
| 10,935,676 | B2* | 3/2021 | Roy | G01T 3/06 |
| 11,321,166 | B2* | 5/2022 | Kurihara | G06F 11/1004 |

OTHER PUBLICATIONS

T. Karnik and P. Hazucha, "Characterization of soft errors caused by single event upsets in CMOS processes," in IEEE Transactions on Dependable and Secure Computing, vol. 1, No. 2, pp. 128-143, Apr.-Jun. 2004. (Year: 2004).*

Hands et al., "Large-scale multiple cell upsets in 90 nm commercial SRAMs during neutron irradiation," IEEE Transactions on Nuclear Science, Dec. 11, 2012, 59(6):2824-2830.

Naganawa et al., "A cold/ultracold neutron detector using fine-grained nuclear emulsion with spatial resolution less than 100 nm," The European Physical Journal C, 2018, 78:959, 7 pages.

Shishido et al., "High-Speed Neutron Imaging Using a Current-Based Delay-Line Detector of Kinetic Inductance," Physical Review Applied, 2018, 10:044044, 10 pages.

Tonfat et al., "Analyzing the effectiveness of a frame-level redundancy scrubbing technique for SRAM-based FPGAs," IEEE Transactions on Nuclear Science, Dec. 11, 2015, 62(6):3080-3087.

Tremsin et al., "Detection efficiency, spatial and timing resolution of thermal and cold neutron counting MCP detectors," Nuclear Instruments and Methods in Physics Research A, 2009, 604:140-143.

Tsiligiannis et al., "Multiple cell upset classification in commercial SRAMs," IEEE Transaction on Nuclear Science, Aug. 14, 2014, 61(4):1747-1754.

Tarillo et al., "Neutron Cross-Section of N-Modular Redundancy Technique in SRAM-Based FPGAs," IEEE Transactions on Nuclear Science, Aug. 2014, 61(4):1558-1566, 9 pages.

* cited by examiner

MEMORY ADDRESS/PHYSICAL POSITION CORRESPONDENCE TABLE

| BIT SPECIFYING INFORMATION | | PHYSICAL POSITION | |
|---|---|---|---|
| MEMORY ADDRESS | BIT POSITION | X[$\mu$m] | Y[$\mu$m] |
| 0x0000 | 0 BIT | 0 | 0 |
| 0x0000 | FIRST BIT | 1 | 0 |
| 0x0000 | SECOND BIT | 2 | 0 |
| ... | ... | ... | ... |
| 0x0000 | REDUNDANT BIT X | 4 | 0 |
| 0x0000 | REDUNDANT BIT Y | 5 | 0 |
| 0x0001 | 0 BIT | 6 | 0 |
| 0x0001 | FIRST BIT | 7 | 0 |
| | ... | ... | ... |
| 0x0064 | REDUNDANT BIT Y | 10 | 10 |

NUCLEAR REACTION DETECTION DEVICE, METHOD AND PROGRAM WITH HIGH DETECTION POSITION RESOLUTION

CROSS-REFERENCE TO RELATED APPLICATIONS

This application is a National Stage application under 35 U.S.C. § 371 of International Application No. PCT/JP2020/026279, having an International Filing Date of Jul. 3, 2020, which claims priority to Japanese Application Serial No. 2019-125190, filed on Jul. 4, 2019. The disclosure of the prior applications is considered part of the disclosure of this application, and is incorporated in its entirety into this application.

TECHNICAL FIELD

The present invention relates to a technique for detecting the position of a nuclear reaction.

BACKGROUND ART

In the case of a neutron for example, conventional nuclear reaction detection devices have specified the position where the neutron flies based on (1) a method of amplifying and reading out an electric signal (for example, Non-patent documents 1 and 3), and (2) a method of reading out traces of the secondary particles with a photographic plate (for example, Non-patent document 2), which methods are originated from secondary particles (alpha particles, photons, protons, and the like) emitted from the nucleus that has reacted with the neutron. Among them, as detectors with particularly high detection position resolution, there are an MCP (Micro Channel Plates) detector (Non-patent document 1), a superconducting detector (Non-patent document 3), and a detector using silver halide photographic emulsions for elementary particles (Non-patent document 2).

PRIOR ART DOCUMENT

Non-Patent Document

Non-patent document 1: A. S. Tremsin et al., "Detection Efficiency, Spatial and Timing Resolution of Thermal and Cold Neutron Counting MCP Detectors," Nuclear Instruments and Methods in Physics Research A604 (2009) 140-143

Non-patent document 2: N. Naganawa et al., "A Cold/Ultracold Neutron Detector Using Fine-Grained Nuclear Emulsion with Spatial Resolution Less than 100 nm," Eur. Phys. J. C (2018) 78:959

Non-patent document 3: H. Shishido et al., "High-Speed Neutron Imaging Using a Current-Biased Delay-Line Detector of Kinetic Inductance," PHYSICAL REVIEW APPLIED 10, 044044 (2018)

SUMMARY OF THE INVENTION

Problem to be Solved by the Invention

The neutron detection position resolution of the prior art is 15 µm (55 µm for practical use) at the maximum for the MCP detector, 22 µm at the maximum for the superconducting detector, and 11 nm at the maximum for the detector using the silver halide photographic emulsions for elementary particles. However, the detector using the silver halide photographic emulsions for elementary particles is not able to read information on a neutron incident time. Therefore, in the current state, the maximum position resolution of a detector, which can detect both an incident position and an incident time of a neutron is 10 to 20 µm. All of the detectors utilize the reaction between a neutron and boron (n, alpha), and this reaction is likely to occur with low-energy neutrons. Therefore, a problem is that the detection sensitivity for high-energy neutrons is extremely low.

The present invention is made in view of the above described problems, and an object of the present invention is to provide a nuclear reaction detection device, a method, and a program with high detection position resolution.

Means for Solving the Problem

To achieve the above described object, a nuclear reaction detection device according to the present invention includes a semiconductor memory that integrates therein a semiconductor element that electrically stores one-bit data, and is arranged in an environment in which particle radiation is incident, a position information storage unit that stores spatial position information of the semiconductor element in the semiconductor memory, a semiconductor element specifying unit that detects that an SEU (Single Event Upset) has occurred in the semiconductor element included in the semiconductor memory and specifies the semiconductor element in which the SEU has occurred, and a position calculating unit that calculates a spatial position in which the SEU has occurred, based on the specified semiconductor element and the spatial position information.

Effect of the Invention

According to the present invention, as a sensor, a semiconductor memory in which semiconductor elements are densely integrated is used, and thus a nuclear reaction can be detected with high position resolution. Further, according to the present invention, a general-purpose semiconductor memory is used as a sensor, and thus costs can be reduced.

MODE FOR CARRYING OUT THE INVENTION

Figure 1:
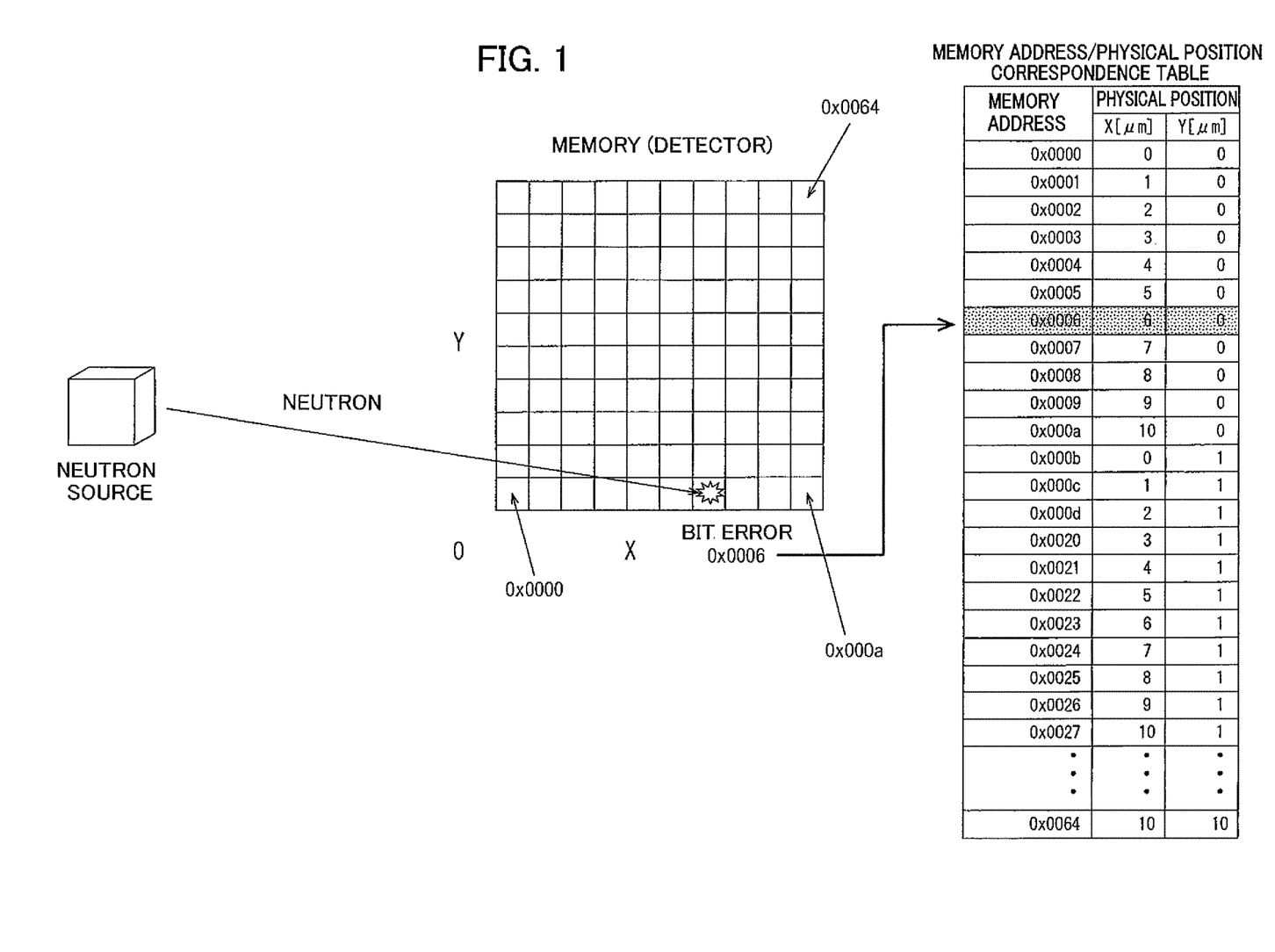
FIG. 1 is a diagram for explaining an outline of the present embodiment.

An outline of the present embodiment will be described with reference to FIG. 1. The technique of the present embodiment is a technique for measuring a nuclear reaction with high position resolution by using an SEU (Single Event Upset). The technique relates to a method for detecting the position at which a nuclear reaction has occurred with high accuracy by specifying the position at which an SEU has occurred.

An SEU means an event in which a single particle (a neutron, proton, heavy particle, or the like) is incident on an LSI (Large Scale Integration), such as a memory, and data (a bit) stored in the LSI is inverted by charge generated by the nuclear reaction. An SEU is also called a soft error.

In recent years, the refinement of semiconductors has advanced in accordance with the high integration of semiconductors. Therefore, in the case of a memory, the number of bits storable per unit area has increased. However, if neutrons are incident on a memory such as an SRAM (Static Random Access Memory), a nuclear reaction may occur, and secondary particles may cause a soft error in which the bits stored in the memory are inverted. In general, in order to detect/correct such a soft error, codes such as Parity and ECC (Error Correction Code) are assigned to the memory, and thus the address of an inverted bit can be specified. As shown in FIG. 1, a physical position (a spatial position) is identified from this address to identify a bit in which a soft error has occurred. The soft error itself is caused by a secondary particle. However, a position of the secondary particle, and a position of the nuclear reaction between the neutron that has generated the secondary particle and the silicon nucleus are almost at the same position, and thus it is possible to identify the position where the neutron is incident. If a plurality of bits are inverted, an average position of the plurality of bits is set as the physical position.

As described above, in the present embodiment, a semiconductor memory is disposed in an environment in which particle radiation is incident, such as a neutron irradiation area, and the semiconductor memory is used as a kind of sensor (a detector). The semiconductor memory that can be used in the present embodiment may be a memory obtained by integrating semiconductor elements that can electrically hold one-bit data. The semiconductor memory usable in the present embodiment may be either a volatile or non-volatile memory. Further, the mode for electrically holding the data may be the mode of electrically holding the data statically by means of a circuit such as a flip-flop. Alternatively, the mode may be the mode of electrically holding the data by means of the charge of a capacitor and dynamically maintaining the holding state. The semiconductor memories usable in the present embodiment are, for example, an SRAM, a DRAM (Dynamic Random Access Memory), an EPROM (Erasable Programmable Read Only Memory), an EEPROM (Electrically Erasable Programmable Read Only Memory) or the like. However, from the viewpoint of the sensitivity, it is preferable to use an SRAM.

In the above, the bit in which the soft error has occurred is specified by using an error detection and correction technique such as Parity or ECC. However, the bit in which the soft error has occurred may be specified by storing data having a predetermined value in each address of the memory, monitoring the data value of each address, and comparing the data value with the predetermined value.

In the present embodiment, spatial position information is stored in predetermined storage means in advance. The spatial position information is information for deriving the spatial position of the bit in the memory, from the information for specifying the bit in which the soft error has occurred. The information for specifying the bit in which the soft error has occurred includes, for example, a memory address and a bit position. Further, the spatial position is specified by a set of a vertical position X and a horizontal position Y, when the surface of the chip forming the memory is an XY plane. The position of a reference point in the XY plane may be any position. The spatial position information is information for deriving the spatial position from the bit specifying information, and the spatial position may be derived in any manner. Typically, a correspondence table showing the correspondence between the bit specifying information and the spatial position is created in advance, and the spatial position is derived by referring to the correspondence table. Alternatively, a correspondence table showing the correspondence between an address and the spatial position of a predetermined bit at the address may be created in advance. By referring to the correspondence table, the spatial position may be derived from the address included in the bit specifying information, and a predetermined correction may be made to the derived spatial position based on the bit position included in the bit specifying information. This is because, since the physical structure, in the memory, of data (and a redundant bit) storing a single address is generally the same at each address, if the spatial position of a predetermined bit in one address is known, spatial positions of other bits can be derived.

According to the present embodiment, as a sensor, a semiconductor memory in which semiconductor elements are densely integrated is used. Thus, a nuclear reaction can be detected with high position resolution and high time resolution. For example, a high-capacity SRAM has about 150 Mbits and an area of about 1 $cm^2$. Therefore, the area per bit is about 1 $\mu m^2$, and thus a nuclear reaction can be detected with a position resolution of about 1 μm. A further refinement of the semiconductor manufacturing process rules may improve the position resolution.

In this way, according to the present invention, nuclear reactions can be detected with high position resolution and high time resolution. Therefore, it is expected to use the present invention, for example, in a pulsed neutron source utilization facility which requires the measurement of the position and time at which neutrons are detected (for example, the high-intensity proton accelerator facility J-PARC (Japan Proton Accelerator Research Complex), the material and life science experiment facility MLF (Materials & Life Science Experimental Facility), and small and medium-sized pulsed neutron source facilities being constructed in various regions. Pulsed neutron sources are used in a wide range of scientific and industrial fields, including materials and life sciences, materials and bioengineering, elementary particles and nuclear physics, and earth and planetary science. Therefore, large ripple effects are expected. Meanwhile, a large number of general-purpose memories available in the world can be used, and thus nuclear reaction detectors can be manufactured and used at very low cost in these facilities.

First Embodiment

Figure 2:
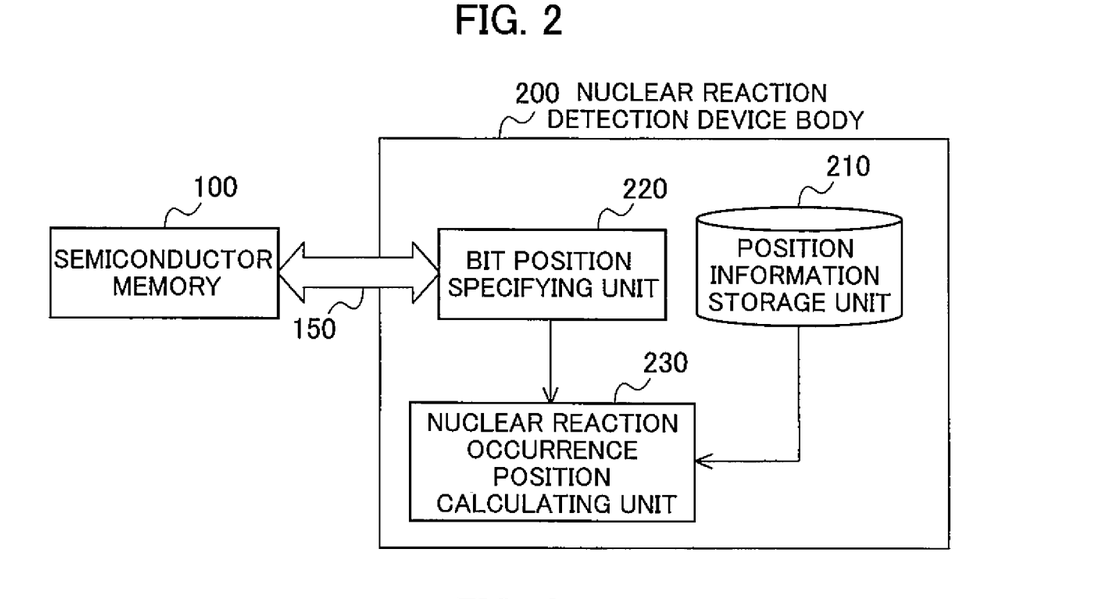
FIG. 2 is a block diagram of a nuclear reaction detection device according to a first embodiment.
Figure 3:
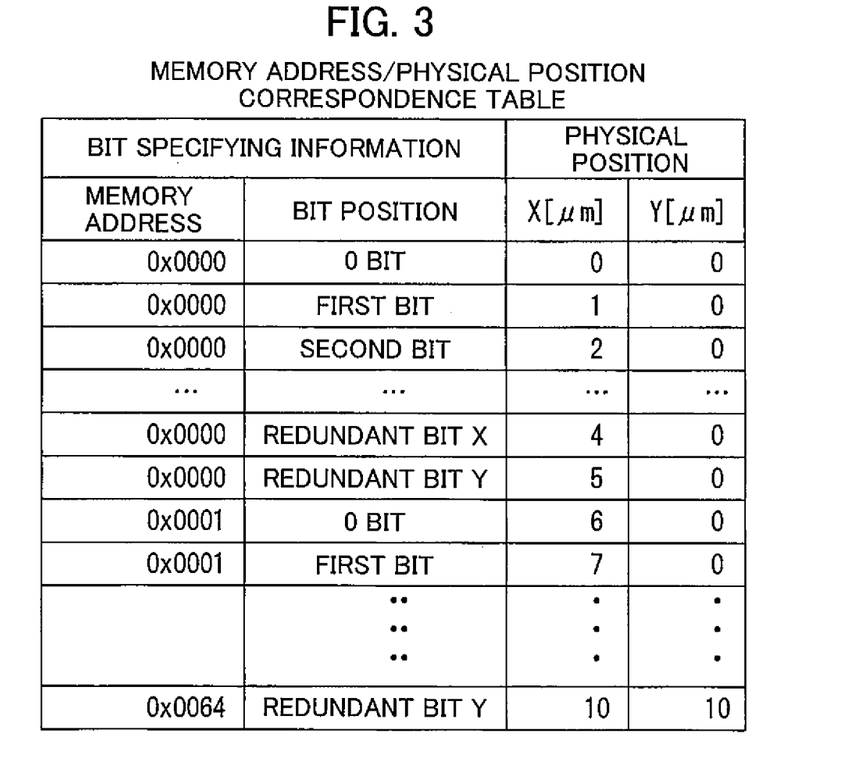
FIG. 3 is an example of a correspondence table in a nuclear reaction detection device according to a first embodiment.
Figure 4:
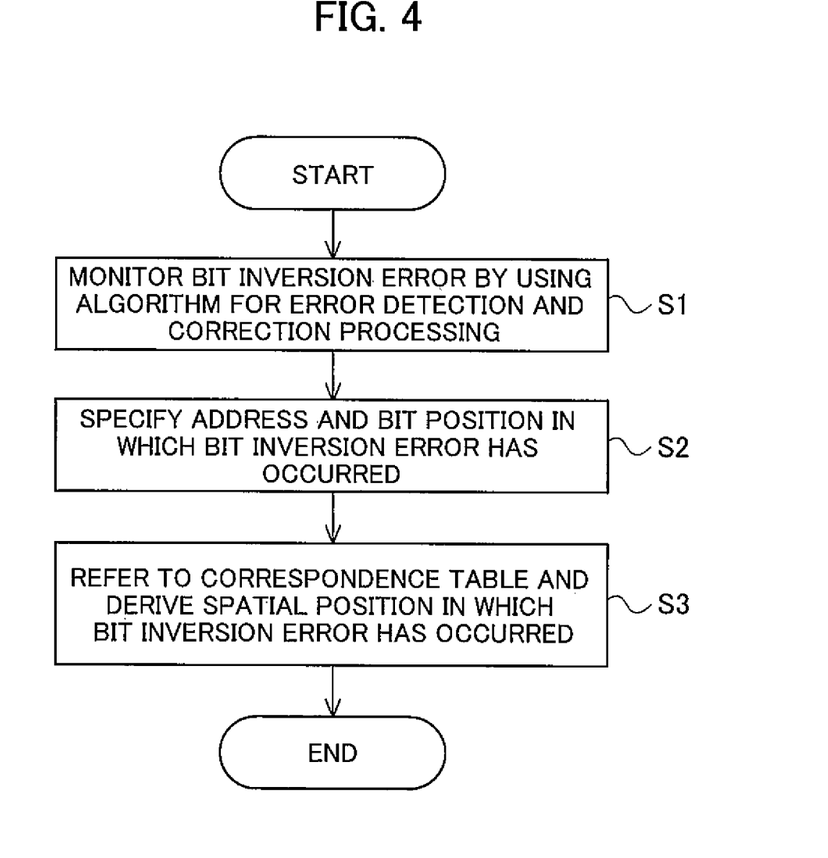
FIG. 4 is a flowchart for explaining operations of a nuclear reaction detection device according to a first embodiment.

Next, a nuclear reaction detection device according to a first embodiment of the present invention will be described with reference to FIGS. 2 to 4. FIG. 2 is a configuration diagram of the nuclear reaction detection device according to the first embodiment. FIG. 3 is an example of a correspondence table in the nuclear reaction detection device according to the first embodiment. FIG. 4 is a flowchart for explaining operations of the nuclear reaction detection device according to the first embodiment.

As shown in FIG. 2, the nuclear reaction detection device includes a semiconductor memory 100 disposed in an environment into which particle radiation is incident, and a nuclear reaction detection device body 200 disposed in an environment protected from the particle radiation.

The semiconductor memory 100 integrates therein a plurality of data semiconductor elements and a redundant bit semiconductor element. The data semiconductor elements correspond to bit strings for storing data accessed by specifying a memory address. The redundant bit semiconductor element corresponds to a redundant bit for error detection and correction processing of the data. The data accessed by specifying the memory address may have any bit length.

An algorithm for the error detection and correction processing may be of any type, as long as it can detect the occurrence of a bit inversion error in the data accessed by specifying one memory address, and can specify the bit position where a bit inversion error occurs. The algorithm for the error detection and correction processing is preferably capable of detecting and specifying not only a bit inversion error in data but also a bit inversion error in the redundant bits. The number of redundant bits is determined according to this kind of algorithm for the error detection and correction processing. The present embodiment uses an algorithm for the error detection and correction processing which can detect and specify not only a bit inversion error in the data but also a bit inversion error in the redundant bits.

As shown in FIG. 2, the nuclear reaction detection device body 200 includes a position information storage unit 210, a bit position specifying unit 220, and a nuclear reaction occurrence position calculating unit 230. The nuclear reaction detection device body 200 is constituted by an information processor. The individual units of the nuclear reaction detection device body 200 may be mounted in any form, and may be constituted by dedicated hardware, may be constituted by a general-purpose device installed with a program, or may be constituted by any combination of these. The bit position specifying unit 220 corresponds to a semiconductor element specifying unit in the claims.

The position information storage unit 210 holds a correspondence table showing the correspondence between the bit specifying information including the address and the bit position, and the spatial position in the semiconductor memory 100 of the semiconductor element specified by the bit specifying information. FIG. 3 shows an example of the correspondence table.

The bit position specifying unit 220 is electrically connected to the semiconductor memory 100 via a predetermined memory bus 150. The bit position specifying unit 220 constantly monitors all the data semiconductor elements and the redundant bit semiconductor element included in the semiconductor memory 100 by using the algorithm for the error detection and correction processing described above (step S1 in FIG. 4). The bit position specifying unit 220 uses the algorithm for the error detection and correction processing using the redundant bit to detect the occurrence of a bit inversion error in the semiconductor element included in the semiconductor memory 100, and specifies the semiconductor element in which the bit inversion error has occurred. Specifically, the bit position specifying unit 220 detects that a bit inversion error has occurred, and specifies the address and the bit position. Then, the bit position specifying unit 220 outputs the fact that a bit inversion error has occurred and the bit specifying information to the nuclear reaction occurrence position calculating unit 230 (step S2).

The nuclear reaction occurrence position calculating unit 230 calculates the spatial position in which the bit inversion error has occurred, based on the specified semiconductor element and the spatial position information. Specifically, after receiving the detection result from the bit position specifying unit 220, the nuclear reaction occurrence position calculating unit 230 refers to the correspondence table of the position information storage unit 210, and derives, from the bit specifying information, the spatial position of the semiconductor element in which the bit inversion error has occurred (step S3). The nuclear reaction occurrence position calculating unit 230 stores the derived spatial position in a predetermined storage unit (not shown) or outputs it to an external device (not shown). At the time of the storage processing or the output processing, time information acquired from a timing device (not shown) can be included. If a plurality of bit inversion errors are detected within a predetermined time, the nuclear reaction occurrence position calculating unit 230 may perform statistical processing such as an average value calculation on the plurality of derived spatial positions and output the processing result.

Second Embodiment

Figure 5:
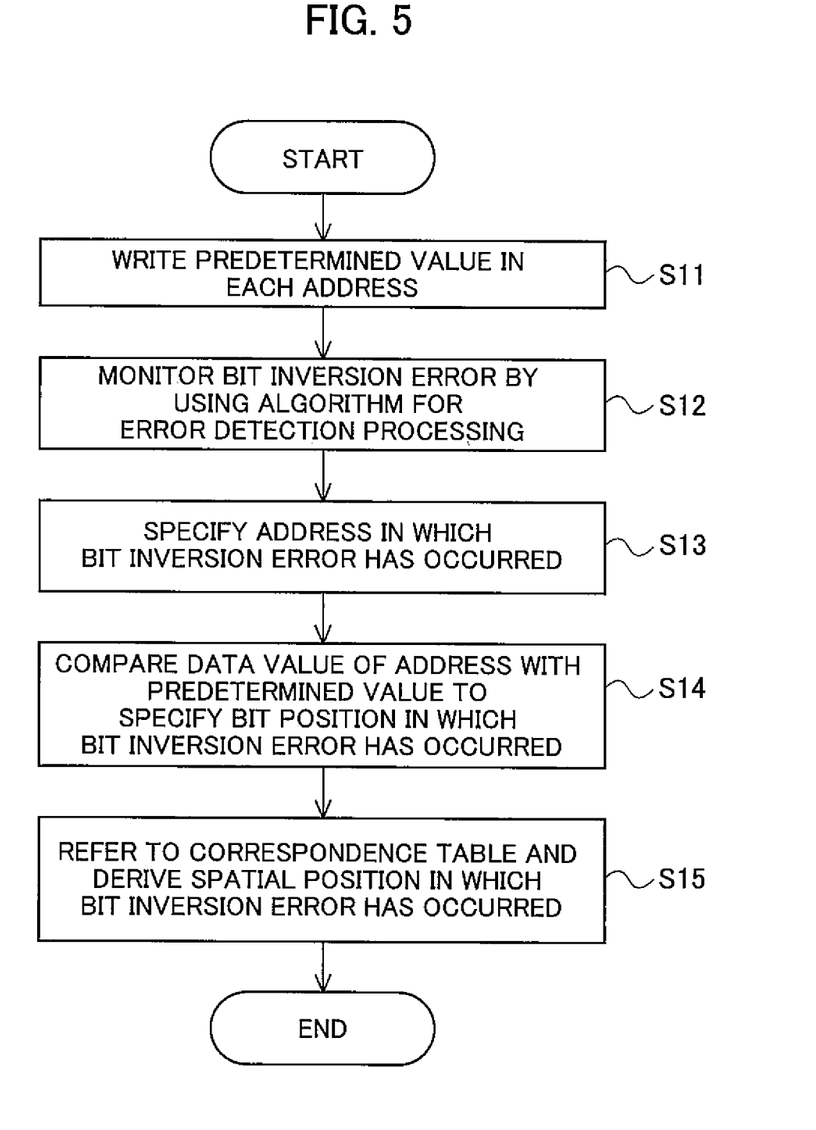
FIG. 5 is a flowchart for explaining operations of a nuclear reaction detection device according to a second embodiment.

Next, a nuclear reaction detection device according to a second embodiment of the present invention will be described with reference to FIG. 5. FIG. 5 is a flowchart for explaining operations of the nuclear reaction detection device according to the second embodiment. The difference between the present embodiment and the first embodiment resides in the processing for specifying the semiconductor element in which a bit inversion error has occurred. Other points of the present embodiment are the same as those of the first embodiment, and thus only the differences will be described below.

In the first embodiment, the algorithm for the error detection and correction processing is used in the processing for specifying the semiconductor element in which a bit inversion error has occurred. In contrast, the processing of the present embodiment uses an algorithm for error detection processing. The algorithm for the error detection processing specifies the occurrence of a bit inversion error, and an address to which the semiconductor element in which the bit inversion error has occurred belongs. However, unlike the first embodiment, in the present embodiment, it is not required to be able to specify the bit position of the semiconductor element in which the bit inversion error has occurred.

In the present embodiment, the algorithm for the error detection processing is used, and thus the semiconductor memory 100 of the present embodiment may have a structure with less redundant bit semiconductor elements than that in the first embodiment.

The bit position specifying unit 220 according to the present embodiment writes data of a predetermined value in each memory address of the semiconductor memory 100 in advance (step S11).

The bit position specifying unit 220 constantly monitors all the data semiconductor elements and the redundant bit semiconductor element in the semiconductor memory 100 by using the algorithm for the error detection processing (step S12). The bit position specifying unit 220 detects that a bit inversion error has occurred, and specifies the address (step S13). The bit position specifying unit 220 compares a data value accessed at the address with the predetermined value, to specify a bit position (the semiconductor element) where the bit inversion has occurred. Then, the bit position specifying unit 220 outputs the fact that the bit inversion error has occurred and the bit specifying information to the nuclear reaction occurrence position calculating unit 230 (step S14). If the data value accessed at the address and the predetermined value are the same value, it can be specified that a bit inversion error has occurred in the redundant bit. Processes at or after the above step are the same as those in the first embodiment (step S15).

Third Embodiment

Figure 6:
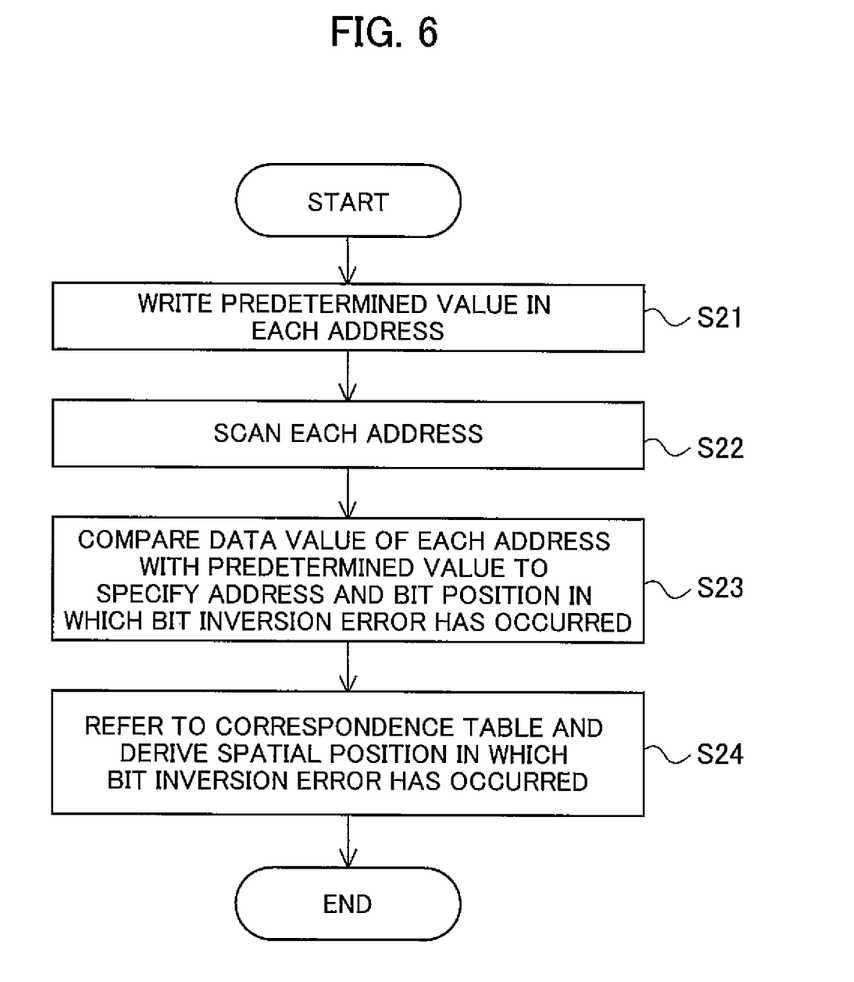
FIG. 6 is a flowchart for explaining operations of a nuclear reaction detection device according to a third embodiment.

Next, a nuclear reaction detection device according to a third embodiment of the present invention will be described with reference to FIG. 6. FIG. 6 is a flowchart for explaining operations of the nuclear reaction detection device according to the third embodiment. The difference between the present embodiment and the first and second embodiments resides in the processing for detecting that a bit inversion error has occurred. Other points of the present embodiment are the same as those of the first and second embodiments, and thus only the differences will be described below.

In the first embodiment, the algorithm for the error detection and correction processing is used in the processing for detecting that a bit inversion error has occurred. Further, in the second embodiment, the algorithm for the error detection processing is used in the processing for detecting that a bit inversion error has occurred. However, the present embodiment does not use the algorithm for the error detection and correction processing or the algorithm for the error detection processing. Therefore, in the present embodiment, as the semiconductor memory 100, a semiconductor memory that does not include the redundant bit semiconductor elements can be used.

The bit position specifying unit 220 according to the present embodiment writes data of a predetermined value in each memory address of the semiconductor memory 100 in advance (step S21).

The bit position specifying unit 220 scans and reads a data value at each memory address of the semiconductor memory 100 (step S22). The bit position specifying unit 220 compares the data value accessed at each address with the predetermined value to detect that a bit inversion error has occurred at the address, specifies the address, and specifies the bit position (the semiconductor element) in which the bit inversion has occurred. Then, the bit position specifying unit 220 outputs the fact that the bit inversion error has occurred and the bit specifying information to the nuclear reaction occurrence position calculating unit 230 (step S23). Processes at or after the above step are the same as those in the first embodiment (step S24).

Although the embodiments of the present invention have been described in detail above, the present invention is not limited to the embodiments described above, and various improvements and modifications may be made without departing from the gist of the present invention.

For example, in the above described embodiments, a case where the semiconductor memory 100 is an SRAM has been described, but the present invention can be applied even if the semiconductor memory 100 is another type of semiconductor memory. In the above embodiments, descriptions have been made using neutron radiation as an example of particle radiation. However, the present invention can be applied even if the particle radiation is another type of particle radiation, as long as an SEU occurs when the particle radiation is incident on the semiconductor memory.

The above described nuclear reaction detection device body 200 can use a general-purpose computer system. For example, the computer system includes a CPU (Central Processing Unit, a processor), a memory, a storage (HDD: Hard Disk Drive, SSD: Solid State Drive), a communication device, an input device, and an output device. The memory and storage are storage devices. In this computer system, each function of the nuclear reaction detection device body 200 is realized by the CPU executing a predetermined program loaded in the memory. The nuclear reaction detection device body 200 may be implemented by a single computer, or alternatively by a plurality of computers. The nuclear reaction detection device body 200 may be a virtual machine mounted on a computer. A program for the nuclear reaction detection device body 200 can be stored in a computer-readable recording medium such as an HDD, SSD, USB (Universal Serial Bus) memory, CD (Compact Disc), DVD (Digital Versatile Disc), or distributed via the network.

EXPLANATION OF THE REFERENCE NUMERALS

100 Semiconductor memory
150 Memory bus
200 Nuclear reaction detection device body
210 Position information storage unit
220 Bit position specifying unit
230 Nuclear reaction occurrence position calculating unit

The invention claimed is:

1. A nuclear reaction detection device comprising:
a semiconductor memory that integrates therein a semiconductor element that electrically stores one-bit data, and is arranged in an environment in which a particle radiation is incident;
a position information storage unit, comprising one or more memory devices, configured to store spatial position information of the semiconductor element in the semiconductor memory;
a semiconductor element specifying unit, comprising one or more hardware processors, configured to detect that an SEU (Single Event Upset) has occurred in the semiconductor element included in the semiconductor memory, and specifies the semiconductor element in which the SEU has occurred; and
a position calculating unit, comprising the one or more hardware processors, configured to calculate a spatial position in which the SEU has occurred, based on the specified semiconductor element and the spatial position information.

2. The nuclear reaction detection device according to claim 1, wherein:
the semiconductor memory includes the semiconductor element corresponding to a redundant bit used in an error detection and correction processing; and
the semiconductor element specifying unit is configured to use an algorithm for the error detection and correction processing using the redundant bit to detect that the SEU has occurred, and specifies the semiconductor element in which the SEU has occurred.

3. The nuclear reaction detection device according to claim 1, wherein:
the semiconductor memory includes the semiconductor element corresponding to a redundant bit used in error detection processing; and
the semiconductor element specifying unit is configured to store data of a predetermined value in each of all memory addresses of the semiconductor memory in advance, use an algorithm for the error detection processing using the redundant bit to detect that the SEU has occurred, and specify a memory address in which the SEU has occurred, and compares a data value of the specified memory address with the predetermined value to specify the semiconductor element in which the SEU has occurred.

4. The nuclear reaction detection device according to claim 1, wherein:
the semiconductor element specifying unit is configured to store data of a predetermined value in each of all memory addresses of the semiconductor memory in advance, scan each of all memory addresses of the semiconductor memory, and compare a value of data stored in a memory address with the predetermined value to detect that the SEU has occurred and specify the semiconductor element in which the SEU has occurred.

5. The nuclear reaction detection device according to claim 1, wherein:
the semiconductor memory comprises an SRAM.

6. A nuclear reaction detection method comprising the steps of:
arranging a semiconductor memory that integrates therein a semiconductor element that electrically stores one-bit data, in an environment in which a particle radiation is incident;
detecting, by a semiconductor element specifying unit, that an SEU (Single Event Upset) has occurred in the semiconductor element included in the semiconductor memory, and specifying the semiconductor element in which the SEU has occurred; and
calculating, by a position calculating unit, a spatial position in which the SEU has occurred, based on the specified semiconductor element and spatial position information of the semiconductor element stored in a position information storage unit in the semiconductor memory.

7. A computer-readable recording medium storing a nuclear reaction detection program, wherein executing of the nuclear reaction detection program causes one or more computers to perform operations comprising:
detecting that an SEU (Single Event Upset) has occurred in a semiconductor element included in a semiconductor memory, and specifying the semiconductor element in which the SEU has occurred; and
calculating a spatial position in which the SEU has occurred, based on the specified semiconductor element and spatial position information of the semiconductor element stored in a position information storage unit in the semiconductor memory, wherein
the semiconductor memory that integrates therein the semiconductor element that electrically stores one-bit data is arranged in an environment in which a particle radiation is incident.

* * * * *